(12) United States Patent
Hwang et al.

(10) Patent No.: US 8,699,136 B2
(45) Date of Patent: Apr. 15, 2014

(54) METHOD AND APPARATUS FOR ADJUSTING POSITION OF OPTICAL ELEMENT

(75) Inventors: Young-jae Hwang, Suwon-si (KR); Jin-gi Lee, Changwon-si (KR); Kwang-seok Byon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 13/272,398

(22) Filed: Oct. 13, 2011

(65) Prior Publication Data

US 2012/0236414 A1    Sep. 20, 2012

(30) Foreign Application Priority Data

Mar. 14, 2011    (KR) .................. 10-2011-0022456

(51) Int. Cl.
  *G02B 27/64*    (2006.01)
(52) U.S. Cl.
  CPC .................................. *G02B 27/646* (2013.01)
  USPC .......................................... 359/554; 396/55
(58) Field of Classification Search
  USPC ......... 348/208.99, 208.1–208.16; 396/52–55; 359/554–557
  See application file for complete search history.

(56) References Cited

U.S. PATENT DOCUMENTS

| | | | | | |
|---|---|---|---|---|---|
| 5,881,325 | A | * | 3/1999 | Imura et al. | 396/55 |
| 5,897,226 | A | * | 4/1999 | Okada et al. | 396/55 |
| 5,974,269 | A | * | 10/1999 | Sato et al. | 396/55 |
| 2005/0169618 | A1 | * | 8/2005 | Akada | 396/55 |

\* cited by examiner

*Primary Examiner* — Derek S Chapel
(74) *Attorney, Agent, or Firm* — Drinker Biddle & Reath LLP

(57) ABSTRACT

An apparatus for adjusting a position of an optical element is disclosed. The apparatus includes: a support; a movement unit for supporting an optical element and being movable relative to the support; a magnet unit; a coil unit for generating a magnetic force for moving the movement unit when an electrical signal is applied; a sensor unit disposed in a position corresponding to the magnet unit for detecting a relative position of the movement unit with respect to the support; a locking unit for limiting or allowing movement of the movement unit; and a controlling unit connected to the coil unit for controlling the coil unit and determining whether the movement unit is in a state where movement of the movement unit is limited by the locking unit based on a signal output from the sensor unit.

21 Claims, 9 Drawing Sheets

METHOD AND APPARATUS FOR ADJUSTING POSITION OF OPTICAL ELEMENT

CROSS-REFERENCE TO RELATED PATENT APPLICATIONS

This application claims the priority benefit of Korean Patent Application No. 10-2011-0022456, filed on Mar. 14, 2011 in the Korean Intellectual Property Office, which is incorporated herein in its entirety by reference.

BACKGROUND OF THE INVENTION

1. Field of the Invention

One or more aspects of the invention relate to a method and an apparatus for adjusting a position of an optical element, and, more particularly, to a method and an apparatus for adjusting a position of an optical element, whereby movement of a movement unit is limited so that the position of the optical element may be stably maintained.

2. Description of the Related Art

Shake correction apparatuses used in a camera perform a function of preventing a clearness of an image from being lowered due to a user's hand tremble. Shake correction apparatuses include a power operated driving device that changes a position of an optical element such as a lens. Because the position of the optical element should not be changed when a shake correction function is not performed, power should be supplied to the driving device so as to fix the position of the optical element. In this way, in the related art, the driving device for driving the optical element consumes power even when the shake correction function is not performed.

SUMMARY OF THE INVENTION

One or more aspects of the invention provide a method and an apparatus for adjusting a position of an optical element, whereby power consumption is minimized or reduced.

One or more aspects of the invention also provide a method and an apparatus for adjusting a position of an optical element, whereby the position of the optical element is stably maintained even when a shake correction function is not performed or needed.

One or more aspects of the invention also provide a method and an apparatus for adjusting a position of an optical element, whereby it may be determined whether a state in which the position of the optical element is maintained even when a shake correction function is not performed.

According to an aspect of the invention, there is provided an apparatus for adjusting a position of an optical element, the apparatus including: a support; a movement unit for supporting an optical element and being movable relative to the support; a magnet unit disposed on one selected from the group consisting of the support and the movement unit; a coil unit disposed on the other of the group consisting of the support and the movement unit to correspond to the magnet unit for generating a magnetic force for moving the movement unit when an electrical signal is applied; a sensor unit disposed in a position corresponding to the magnet unit for detecting a relative position of the movement unit with respect to the support; a locking unit for limiting or allowing movement of the movement unit; and a controlling unit connected to the coil unit for controlling the coil unit and determining whether the movement unit is in a state where movement of the movement unit is limited by the locking unit based on a signal output from the sensor unit.

Movement of the movement unit may be limited by the locking unit when the movement unit is in a position in which the movement unit is rotated with respect to the support by a predetermined angle.

The locking unit may include: a magnet disposed on the support so as to be separable from an outside of the movement unit; and a yoke disposed on the movement unit to correspond to the magnet.

The locking unit may include: a yoke disposed on the support so as to be separable from an outside of the movement unit; and a magnet disposed on the movement unit to correspond to the yoke.

The sensor unit may generate a signal that changes as the movement unit rotates and as a position of the sensor unit relative to the magnet unit changes, and the controlling unit may determine whether the movement unit is in a state in which movement of the movement unit is limited by the locking unit based on the signal output from the sensor unit.

The locking unit may operate in response to a control signal applied by the controlling unit, and a position of the locking unit may be changed between a locked position in which the locking unit contacts the movement unit and a release position in which the locking unit is separated from the movement unit.

The locking unit may include: a coupling pin that can be inserted in a hole formed in the movement unit; and a driving unit for moving the coupling pin such that the coupling pin is inserted in the hole.

The sensor unit may generate a signal that changes as the movement unit rotates and as a position of the sensor unit relative to the magnet unit changes, and the controlling unit may drive the locking unit to move to the locked position, may drive the coil unit to rotate the movement unit, and may receive the signal output from the sensor unit to determine whether the locking unit and the movement unit are in a coupled state based on the signal output from the sensor unit.

The magnet unit may include a first magnet disposed in such a way that a direction of magnetism is a first direction and a second magnet disposed in such a way that a direction of magnetism is a second direction that crosses the first direction, and the sensor unit may include a first sensor disposed to correspond to the first magnet and for generating a signal according to a relative position of the first magnet in the first direction and a second sensor disposed to correspond to the second magnet and for generating a signal according to a relative position of the second magnet in the second direction, and the controlling unit may determine whether the locking unit and the movement unit are in a coupled state based on at least one signal from the first sensor and the second sensor.

The apparatus may further include a gravity sensor unit for detecting a change in a position of the support with respect to a gravity direction, wherein the controlling unit may select one from the group consisting of the first sensor and the second sensor based on a signal of the gravity sensor unit and may determine whether the locking unit and the movement unit are in a coupled state.

According to another aspect of the invention, there is provided a method of adjusting a position of an optical element, the method including: limiting movement of a movement unit supporting an optical element and being movable relative to a support; receiving a signal output from a sensor unit disposed on one selected from the group consisting of the support and the movement unit to correspond to a magnet unit disposed on the other of the group consisting of the support and the movement unit; and determining whether the movement unit is in a state in which movement of the movement unit is limited based on the signal output from the sensor unit.

The limiting of movement of the movement unit may include limiting rotation of the movement unit when the movement unit is in a position in which the movement unit is rotated with respect to the support by a predetermined angle.

The sensor unit may generate a signal that changes as the movement unit moves and as a position of the sensor unit relative to the magnet unit changes, and the determining of whether the movement unit is in a state in which movement of the movement unit is limited may include determining whether the movement unit is in a state in which movement of the movement unit is limited based on the signal output from the sensor unit.

The sensor unit may generate a signal that changes as the movement unit moves and as a position of the sensor unit relative to the magnet unit changes, and the limiting of movement of the movement unit may include limiting movement of the movement unit by contacting a locking unit of which a position is changed between a locked position in which the locking unit contacts the movement unit, and a release position in which the locking unit is separated from the movement unit and generating power for rotating the movement unit, and the determining of whether the movement unit is in a state where movement of the movement unit is limited, may include determining whether the movement unit is in a state where movement of the movement unit is limited based on the signal output from the sensor unit.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Hereinafter, a structure and operation of an apparatus and a method of adjusting a position of an optical element according to embodiments of the invention will be described in detail with reference to the attached drawings.

Figure 1:
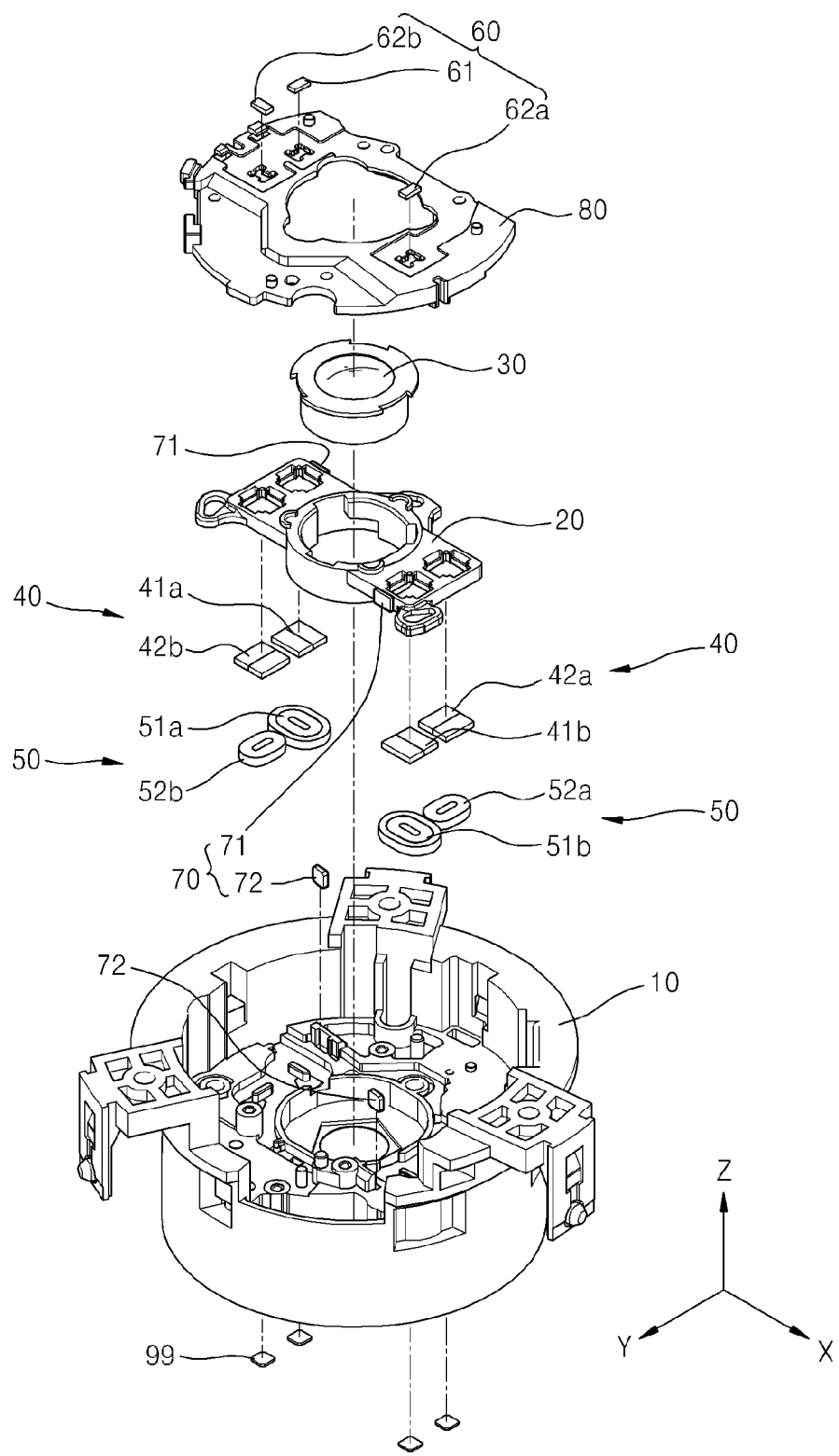
FIG. 1 is an exploded perspective view of elements of an apparatus for adjusting a position of an optical element, according to an embodiment of the invention.
Figure 2:
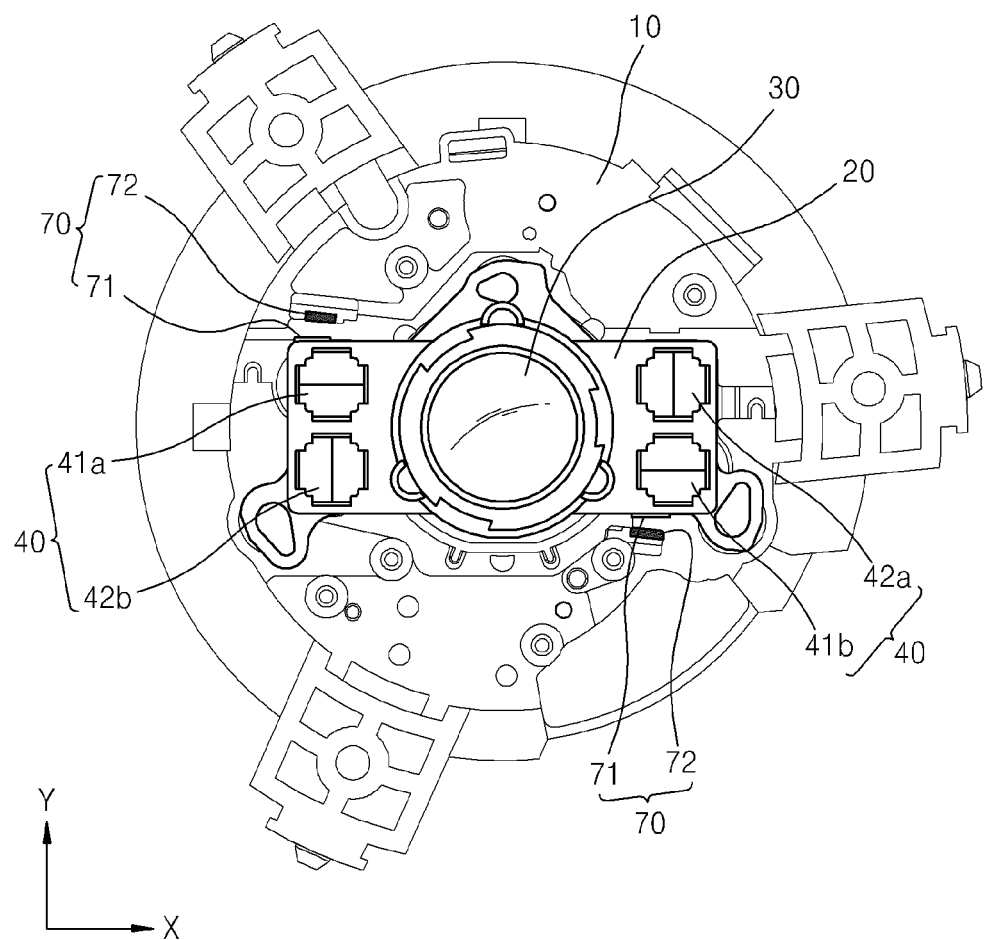
FIG. 2 is a plan view of the apparatus for adjusting a position of an optical element illustrated in FIG. 1.

FIG. 1 is an exploded perspective view of elements of an apparatus for adjusting a position of an optical element, according to an embodiment of the invention, and FIG. 2 is a plan view of the apparatus for adjusting a position of an optical element illustrated in FIG. 1.

The apparatus for adjusting a position of an optical element illustrated in FIGS. 1 and 2 includes a support 10, a movement unit 20 that is movable relative to the support 10, magnet units 40 disposed on the support 10 or the movement unit 20, coil units 50 that generate a magnetic force that act on respective ones of the magnetic units 40, a sensor unit 60 that generates a signal according to a relative position of the movement unit 20 with respect to the magnetic units 40 and detects the signal, locking units 70 that limit or allow movement of the movement unit 20, and a controlling unit (not shown). The controlling unit (not shown) will be described below in connection with FIG. 6.

The support 10 supports the movement unit 20 in a way that allows the movement unit 20 to move in directions of a first axis (X-axis) and a second axis (Y-axis) that cross an optical axis (Z-axis) passing through a lens 30 as an optical element. The movement unit 20 may move with respect to the support 10 while surrounding and supporting the lens 30.

When an image to be captured by an image capturing device (not shown) may not be clear due to a shake such as a hand tremble, a shake correction function is performed by moving the movement unit 20 relative to the support 10 so that the image to be captured by the image capturing device (not shown) may be clear.

The magnetic units 40 are disposed on the movement unit 20. The magnetic units 40 include respective first magnets 41a and 41b disposed in such a way that a direction of magnetism is a direction of the Y-axis as a first direction, and respective second magnets 42a and 42b disposed in such a way that a direction of magnetism is a direction of the X-axis as a second direction crossing or perpendicular to the first direction.

The coil units 50 are disposed on the support 10 to correspond to the magnet units 40. When electricity is supplied to the coil units 50, the coil units 50 generate magnetic forces that act on the magnetic units 40 so that a driving force for moving the movement unit 20 may be generated. The coil units 50 each include first coils 51a and 51b that correspond to the first magnets 41a and 41b, respectively, and second coils 52a and 52b that correspond to the second magnets 42a and 42b, respectively.

In FIG. 1, the coil units 50 are disposed on the support unit 10, and the magnetic units 40 are disposed on the movement unit 20. However, the invention is not limited to this configuration, and the coil units 50 may be disposed on the movement unit 20, and the magnetic units 40 may be disposed on the support 10.

Yokes 99 are installed at a lower side of the support 10. An attractive force is generated between the yokes 99 and respective magnet units 40 and, thus, the movement unit 20 may be closely adhered to or kept in close proximity to the support 10.

When the movement unit 20 is coupled to the support 10, a cover 80 is coupled to the support 10 so as to cover edges of the movement unit 20. The sensor unit 60 is disposed on the cover 80. The sensor unit 60 includes a first sensor 61 disposed to correspond to the first magnet 41a, and second sensors 62a and 62b disposed to correspond to the second magnets 42a and 42b, respectively. Hall sensors that output an electrical signal in proportion to an external magnetic field using a Hall effect may be used as the first sensor 61 and the second sensors 62a and 62b.

The locking unit 70 limits or allows movement of the movement unit 20. The locking unit 70 includes magnets 71 disposed on the movement unit 20 so as to be separable from an inside of the support 10, and yokes 72 disposed on the support 10 to correspond to the magnets 71. The yokes 72 adhere to the magnets 71 due to magnetic forces of the magnets 71. However, the invention is not limited to this configuration, and the magnets 71 may be disposed on the movement unit 20, and the yokes 72 may be disposed on the support 10.

Figure 3:
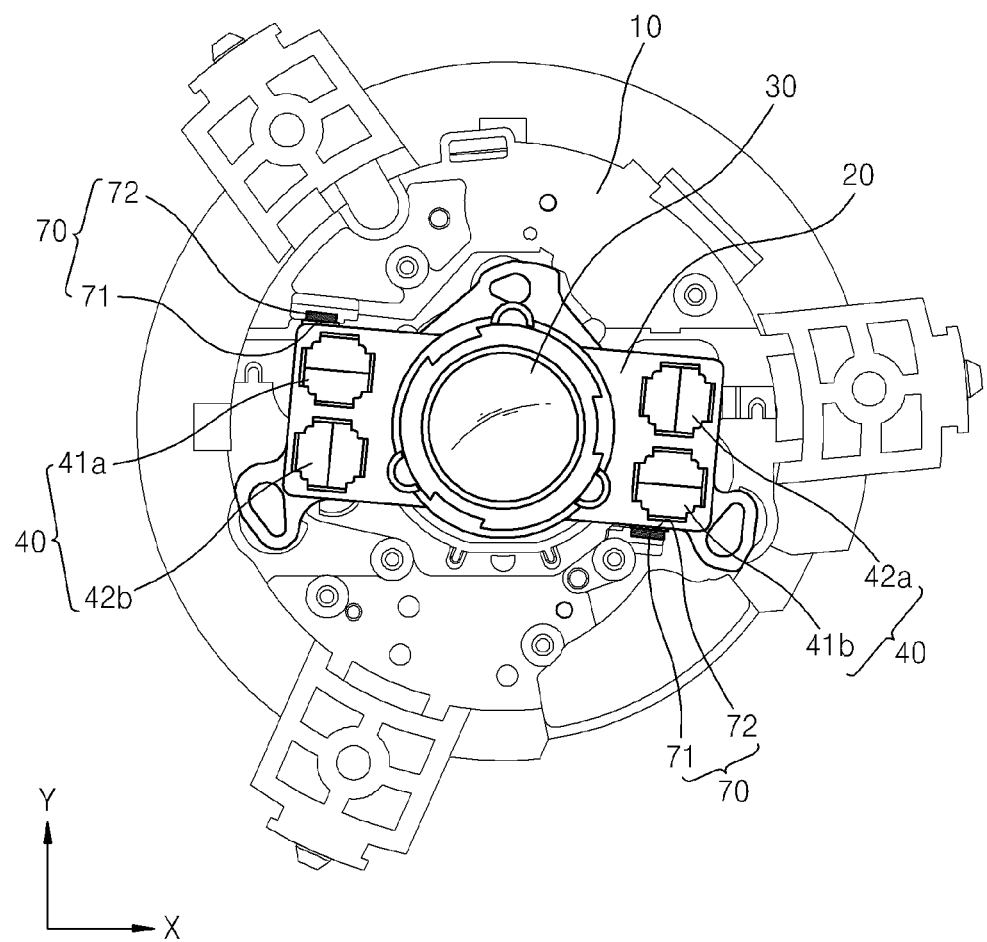
FIG. 3 is a plan view illustrating an operating state of the apparatus for adjusting a position of an optical element illustrated in FIG. 2.

FIG. 3 is a plan view illustrating an operating state of the apparatus for adjusting a position of an optical element illustrated in FIG. 2. The operating state shown in FIG. 3 corresponds to a locked state of the movement unit 20.

The movement unit 20 moves relative to the support 10 in the directions of the X-axis and the Y-axis due to actions of the coil units 50 and the magnet units 40 so that a position of the lens 30 relative to the support 10 may be adjusted and the shake correction function may be performed. When the shake correction function is not performed or needed, the movement unit 20 may be clockwise rotated to a predetermined angle, as illustrated in FIG. 3, so that the magnets 71 and the yokes 72 may be coupled to each other due to magnetic forces.

In FIG. 3, even when a supply of electricity to the coil units 50 is stopped, due to actions of the magnets 71 and the yokes 72, the movement unit 20 is fixed on the support 10. This state where the movement unit 20 is fixed on the support 10 is referred to herein as a 'locked state.'

Figure 4:
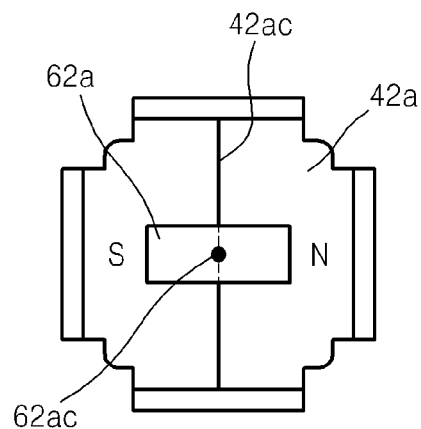
FIG. 4 is an enlarged plan view of a part of the apparatus for adjusting a position of an optical element illustrated in FIG. 2.
Figure 5:
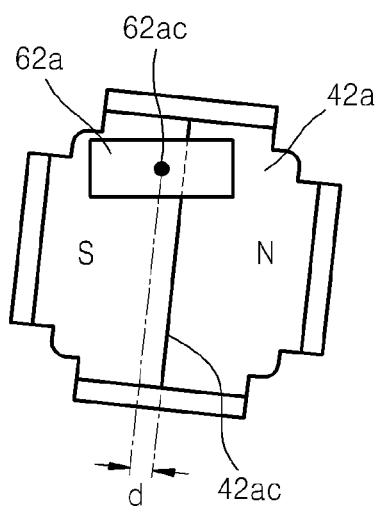
FIG. 5 is an enlarged plan view of a part of the apparatus for adjusting a position of an optical element illustrated in FIG. 3.
Figure 6:
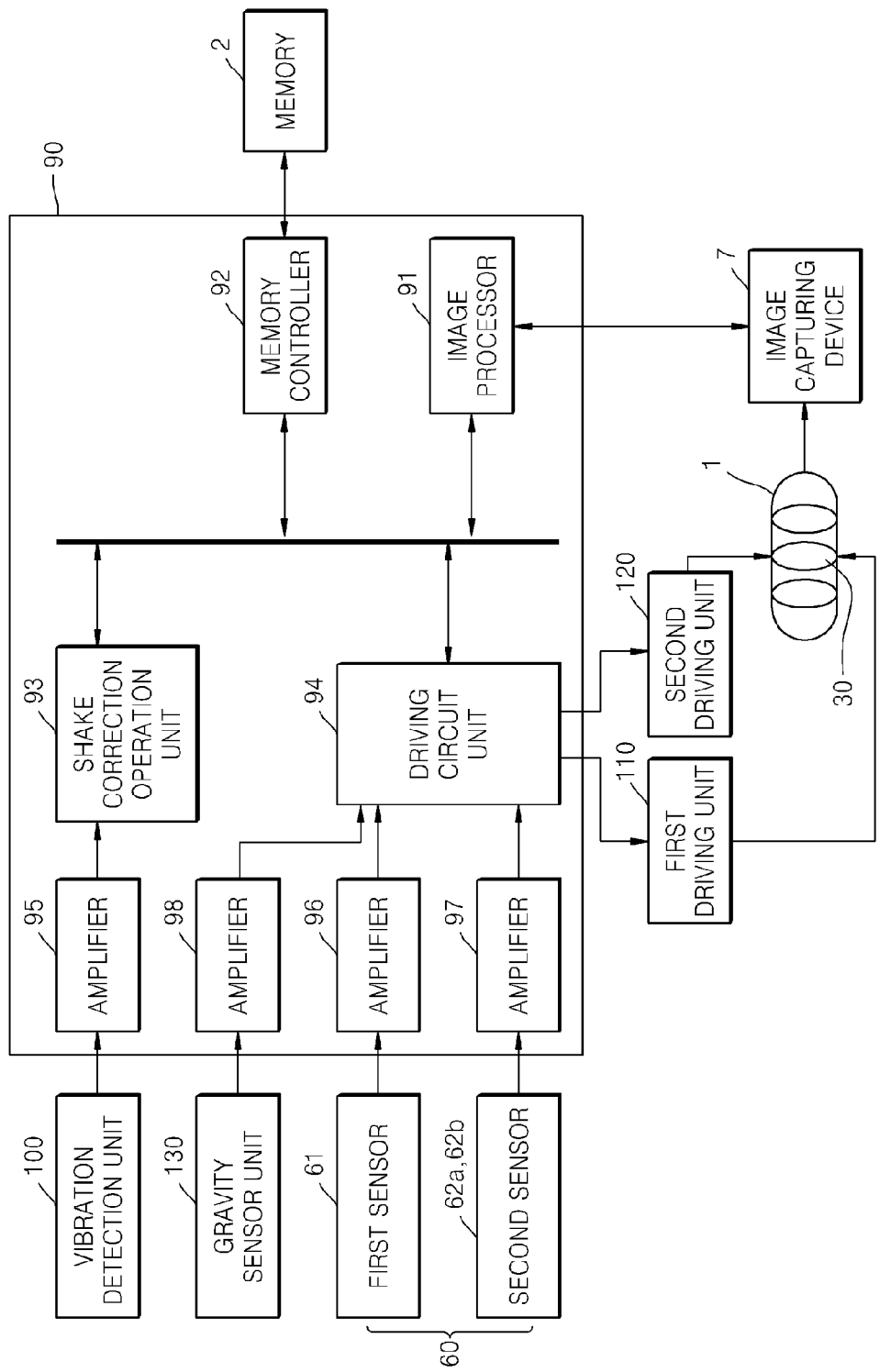
FIG. 6 is a schematic block diagram of elements of the apparatus for adjusting a position of an optical element illustrated in FIG. 1.

FIG. 4 is an enlarged plan view of a part of the apparatus for adjusting a position of an optical element illustrated in FIG. 2, and FIG. 5 is an enlarged plan view of a part of the apparatus for adjusting a position of an optical element illustrated in FIG. 3. FIG. 6 is a schematic block diagram of elements of the apparatus for adjusting a position of an optical element illustrated in FIG. 1.

Referring to FIG. 6, a controlling unit 90 is electrically connected to several elements such as an image capturing device 7, a first driving unit 110, a second driving unit 120, the sensor unit 60, a vibration detection unit 100, and a gravity sensor unit 130. The controlling unit 90 exchanges control signals with the elements so as to control operations of the elements or performs a function of processing data, or the like.

The first driving unit 110 controls the first coils 51a and 51b, and the second driving unit 120 controls the second coils 52a and 52b. Thus, the controlling unit 90 controls the coil units 50, thereby controlling relative movement of the movement unit 20.

The controlling unit 90 includes an image processor 91, a memory controller 92, a shake correction operation unit 93, a driving circuit unit 94, and a plurality of amplifiers 95, 96, 97, and 98.

The image capturing device 7 receives light reflected by a subject and generates a corresponding image signal as an electrical signal. The image processor 91 of the controlling unit 90 converts the image signal obtained by the image capturing device 7 into image data representing an image of the subject. The image data converted by the image processor 91 may be stored by the memory controller 92 in a memory 2.

The shake correction operation unit 93 is connected to the vibration detection unit 100 through the amplifier 95. The vibration detection unit 100 may detect vibrations caused by a hand tremble, etc. The vibration detection unit 100 may be a gyroscopic sensor that detects an amount of displacement generated by a hand tremble, for example. The shake correction operation unit 93 operates to correct the amount of displacement detected by the vibration detection unit 100 by moving the movement unit 20 and, thus, the lens 30.

The first sensor 61 is connected to the driving circuit unit 94 of the controlling unit 90 through the amplifier 96, and the second sensors 62a and 62b are connected to the driving circuit unit 94 of the controlling unit 90 through the amplifier 97. Because the first sensor 61 detects a position of the movement unit 20 relative to the support 10 illustrated in FIGS. 1 through 3 in the first direction (Y-axis direction), the driving circuit unit 94 may check a position of the lens 30 in the first direction based on a detection result obtained from the first sensor 61. Also, because the second sensors 62a and 62b detect a position of the movement unit 20 relative to the support 10 in the second direction (X-axis direction), the driving circuit unit 94 may check a position of the lens 30 in the second direction based on a detection result obtained from the second sensors 62a and 62b.

The driving circuit unit 94 determines an amount of driving used to move the lens 30 in the first or second direction based on detection results obtained by the first sensor 61, the second sensors 62a and 62b and a result of an operation performed by the shake correction operation unit 93, and transmits a driving signal to the first driving unit 110 and the second driving unit 120. Thus, the movement unit 20 and, thus, the lens 30 is driven by the first driving unit 110 and the second driving unit 120 to adjust a position of the lens 30 within a lens unit 1 so that a hand tremble phenomenon, for example, affecting a camera may be substantially corrected.

An output signal of the second sensor 62a of the sensor unit 60 according to relative positions of the second sensor 62a and the second magnet 42a will be described with reference to FIGS. 4 and 5. The illustration of FIG. 4 corresponds to the unlocked state of FIG. 3. The illustration of FIG. 5 corresponds to the locked state of FIG. 4. When a center 62ac of the second sensor 62a overlaps a central line 42ac of a magnetic field of the second magnet 42a (as shown in FIG. 4), a signal output from the second sensor 62a is not changed. However, when the center 62ac of the second sensor 62a is off of the central line 42ac of the second magnetic 42a (as shown in FIG. 5), the second sensor 62a generates an output signal that is proportional to a distance d between the center 62ac of the second sensor 62a and the central line 42ac of the second magnetic 42a.

The controlling unit 90 of FIG. 6 may rotate the movement unit 20 to couple the magnets 71 and the yokes 72 of the locking unit 70 to each other. Then, the controlling unit 90 may determine whether the movement unit 20 is in the locked state where movement of the movement unit 20 is limited by the locking unit 70 based on a signal output from the sensor unit 60, which will reflect the distance d and, thus, the amount of rotation of the movement unit 20 toward the locked state.

When the magnet 71 and the yoke 72 of the locking unit 70 are not fully coupled to each other, movement of the movement unit 20 is not limited by the locking unit 70, and the movement unit 20 may rotate freely. The controlling unit 90 may detect that the movement unit 20 is not in the locked state due to an action of the locking unit 70 based on a signal output from the sensor unit 60, which will reflect the distance d and, thus, the amount of rotation of the movement unit 20 away from the locked state.

When the shake correction function is not performed, to minimize power consumed by the coil units 50, a locking unit for limiting movement of the movement unit 20 is needed.

However, to utilize a conventional locking unit, an additional element, such as a motor or a switch, needs to be additionally installed near the movement unit 20. Furthermore, even when the locking unit for mechanically limiting movement of the moving unit 20 is installed, an additional sensor needs to be installed so as to determine whether the locking unit operates properly.

According to the above-described embodiment, the locking unit 70 for limiting movement of the movement unit 20 may be realized by a simple structure including the coil units 50, the magnets 71 and the yokes 72 without need for an additional element, such as a motor, a switch, or the like. In addition, it may be determined whether the locking unit 70 operates properly, using the sensor unit 60, which may be installed as shown in FIGS. 1 and 2, so as to also perform the shake correction function without need for an additional sensor.

Figure 7:
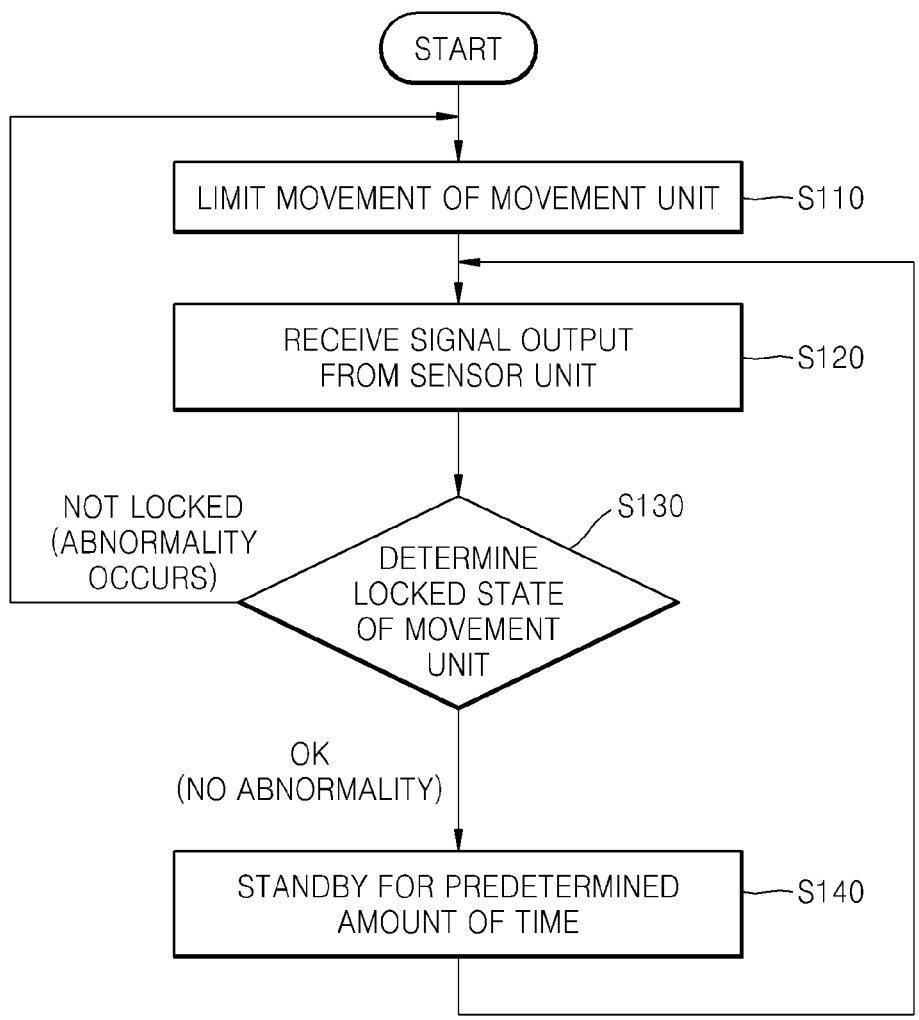
FIG. 7 is a flowchart illustrating a method of adjusting a position of an optical element, according to an embodiment of the invention.

FIG. 7 is a flowchart illustrating a method of adjusting a position of an optical element, according to an embodiment of the invention.

The method of adjusting a position of an optical element may be performed so as to move the movement unit 20 relative to the support 10 to a locked state as illustrated in FIG. 3, when the shake correction function is not needed or performed. When the shake correction function is not performed, in operation S110, movement of the movement unit 20 is limited. In operation S120, a signal output from the sensor unit 60 is received. In operation S130, it is determined whether the movement unit 20 is in a state where movement of the movement unit 20 is limited, i.e., in a locked state of the movement unit 20 based on the signal output from the sensor unit 60.

When, in operation S130, it is determined that movement of the movement unit 20 is not limited (e.g., an abnormality occurred), operation S110 is performed again.

When, in operation S130, it is determined that movement of the movement unit 20 is normally limited (e.g., no abnormality occurred), in operation S140, a predetermined amount of time is spent in standby, and then, the operations starting from operation S120 of receiving the signal output from the sensor unit 60 are repeated. Thus, it may be periodically checked whether a current locked state of the movement unit 20 is being maintained. For example, when an abnormality such as an external shock occurs that causes a locked state of the movement unit 20 to be released, operation S110 of limiting movement of the movement unit 20 may be performed again so that movement of the movement unit 20 may again be limited.

Figure 8:
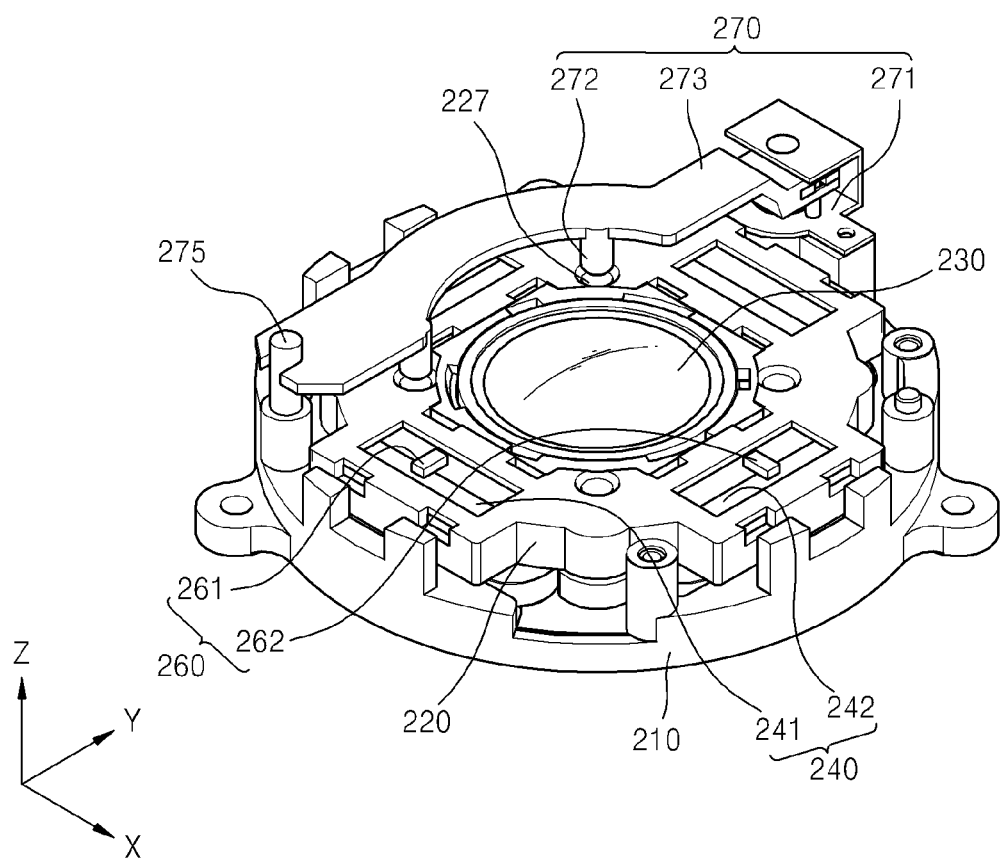
FIG. 8 is a perspective view of an apparatus for adjusting a position of an optical element, according to another embodiment of the invention.

FIG. 8 is a perspective view of an apparatus for adjusting a position of an optical element, according to another embodiment of the invention.

The apparatus for adjusting a position of an optical element illustrated in FIG. 8 includes a support 210, a movement unit 220 that is movable relative to the support 210 and supports a lens 230 as an optical element, a magnet unit 240 disposed on the support 210 or the movement unit 220, a coil unit (not shown) that generates a magnetic force that acts on the magnetic unit 240, a sensor unit 260 that generates a signal according to a relative position to the magnetic unit 240 and detects the signal, a locking unit 270 that limits or allows movement of the movement unit 220, and a controlling unit (not shown).

Because detailed configurations of the coil unit (not shown) and the controlling unit (not shown) are similar to those of FIGS. 1 through 7, illustration of the coil unit and the controlling unit is omitted.

The magnet unit 240 is disposed on the movement unit 220. The magnet unit 240 includes a first magnet 241 disposed in such a way that a direction of magnetism is a direction of a Y-axis as a first direction, and a second magnet 242 disposed in such a way that a direction of magnetism is a direction of an X-axis as a second direction crossing or perpendicular to the first direction.

The sensor unit 260 includes a first sensor 261 disposed to correspond to the first magnet 241, and a second sensor 262 disposed to correspond to the second magnet 242. Hall sensors, for example, may be used as the first sensor 261 and the second sensor 262.

The locking unit 270 limits or allows movement of the movement unit 220 relative to the support 210. The locking unit 270 includes a driving unit 271 that operates in response to a control signal applied by the controlling unit (not shown), a support plate 273 moved by the driving unit 271, and a coupling pin 272 that protrudes from the support plate 273 toward the movement unit 220.

Because an end part of the support plate 273 is moveably supported by a guide rail 275, as the driving unit 271 operates, the support plate 273 may ascend or descend in a direction of a Z-axis.

The movement unit 220 includes a hole 227 in which the coupling pin 272 may be inserted. As illustrated in FIG. 8, because, when the support plate 273 ascends along the direction of the Z-axis due to an action of the driving unit 271, the coupling pin 272 is released from the hole 227, the movement unit 220 may move in the X-axis direction and the Y-axis direction.

Figure 9:
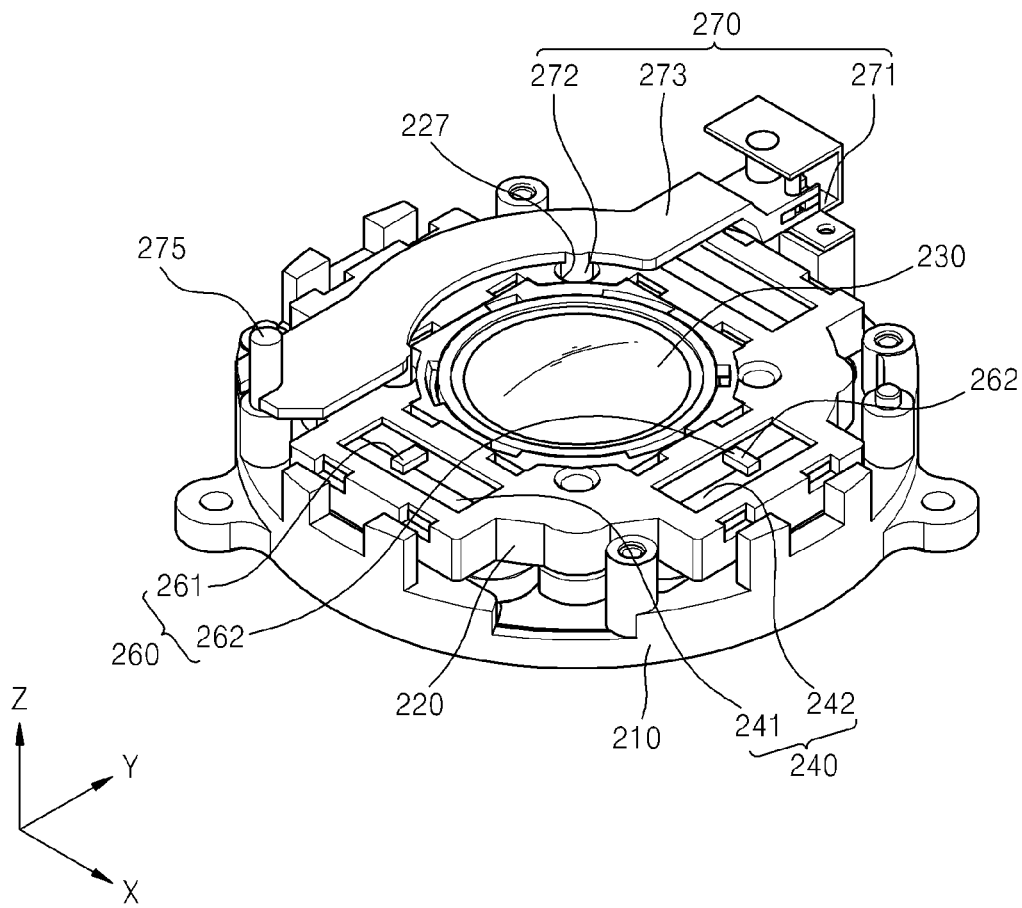
FIG. 9 is a perspective view of an operation of the apparatus for adjusting a position of an optical element illustrated in FIG. 8.
Figure 10:
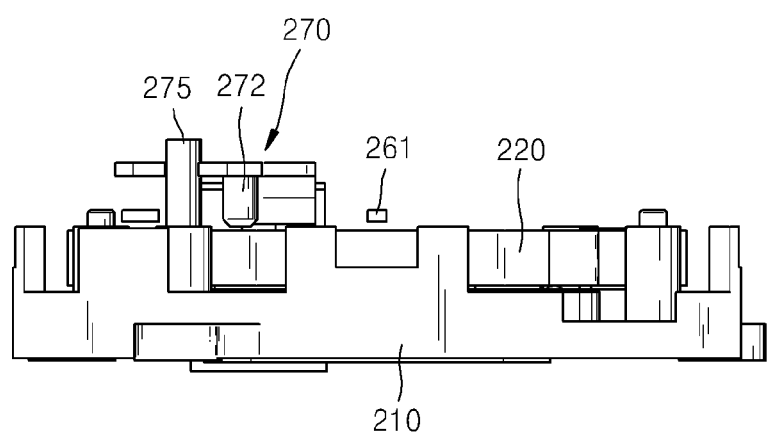
FIG. 10 is a side view of the apparatus for adjusting a position of an optical element illustrated in FIG. 8, according to an embodiment of the invention.
Figure 11:
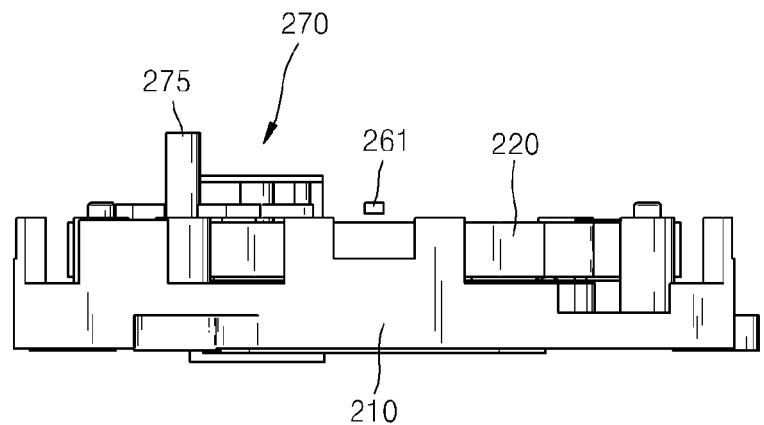
FIG. 11 is a side view of the apparatus for adjusting a position of an optical element illustrated in FIG. 9, according to another embodiment of the invention.

FIG. 9 is a perspective view of an operation of the apparatus for adjusting a position of an optical element illustrated in FIG. 8, FIG. 10 is a side view of the apparatus for adjusting a position of an optical element illustrated in FIG. 8, according to an embodiment of the invention, and FIG. 11 is a side view of the apparatus for adjusting a position of an optical element illustrated in FIG. 9, according to another embodiment of the invention.

Referring to FIG. 9, when the support 273 descends along the Z-axis direction due to an action of the driving unit 271, the coupling pin 272 is inserted in the hole 227 of the movement unit 220. Thus, the movement unit 220 is in a locked state.

When the coupling pin 272 is inserted in the hole 227 of the movement unit 220, movement of the movement unit 220 may be securely limited. However, when the support 273 is moved such that the coupling pin 272 is not inserted in the hole 227 of the movement unit 220, the movement unit 220 may move.

Whether the movement unit 220 is securely in a locked state after the coupling pin 272 is inserted in the hole 227 of the movement unit 220 by operating the driving unit 271 can be checked. For example, after a driving force for rotating the movement unit 220 is generated by driving the coil unit (not shown), a signal output from the sensor unit 260 may obtained, and it may be determined whether the movement unit 220 is in a locked state based on the signal output from the sensor unit 260. If a position of the sensor unit 260 changes relative to the magnet unit 240, a signal output from the sensor unit 260 changes. Thus, it may be determined that the movement unit 220 is not in a locked state based on a signal output from the sensor unit 260. For example, if the signal output by the sensor unit 260 has changed, the movement unit 220 is not in the locked state In operations illustrated in FIG. 7 related to this operation, operation S110 (limiting of movement of the movement unit 220) includes limiting movement of the movement unit 220 by engaging the locking unit 270 and generating power for rotating the movement unit 220. In operation S130, if a signal output from the sensor unit 260 changes, it can be determined that operation S110 (limiting of movement of the movement unit 220) was not properly performed, and, thus, it may be determined that the movement unit 220 is not in a locked state.

Figure 12:
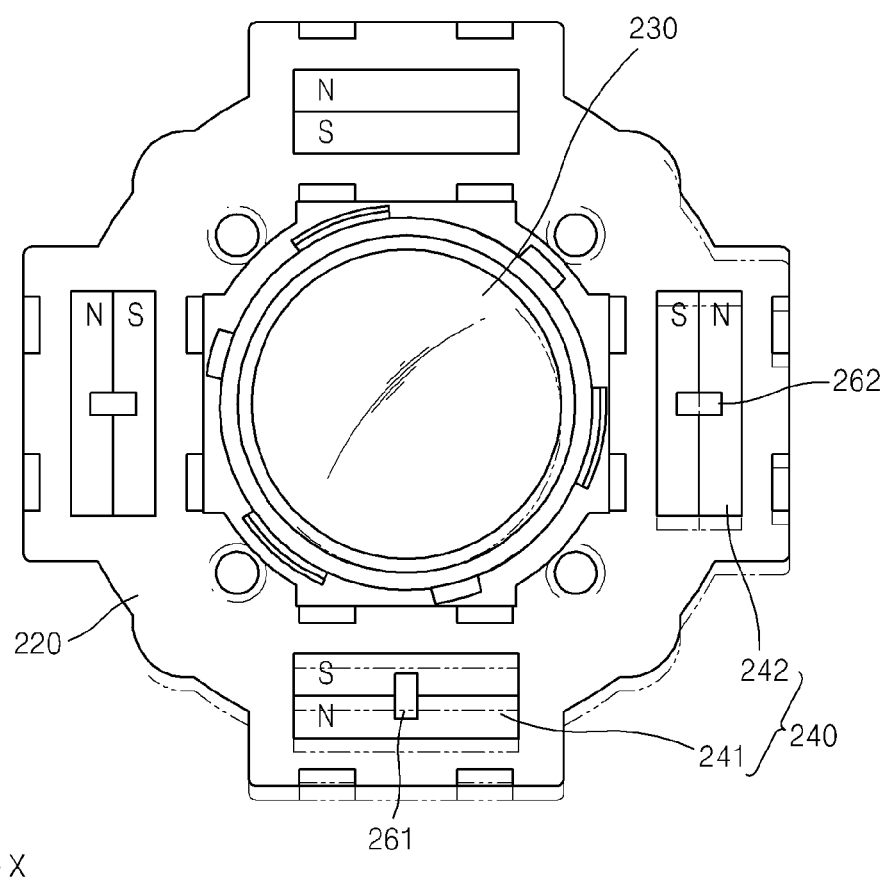
FIG. 12 is a conceptual diagram illustrating an operating state of the apparatus for adjusting a position of an optical element illustrated in FIG. 8.

FIG. 12 is a conceptual diagram illustrating an operating state of the apparatus for adjusting a position of an optical element illustrated in FIG. 8.

FIG. 12 illustrates a case where a position of an optical element of the apparatus for adjusting a position of an optical element of FIG. 8 is changed due to mechanical separation that occurs between elements due to gravity. In FIG. 12, the Y-axis direction is a direction in which gravity is applied.

In FIG. 12, an original position of the movement unit 220, which supports the lens 230 as an optical element, is indicated by a solid line. However, as gravity is applied in the Y-axis direction, due to mechanical separation between elements, the movement unit 220 may move in the Y-axis direction downwards by a predetermined distance, as illustrated by a dotted line in FIG. 12. Because, in this state, a center of magnetism of the first magnet 241 disposed on the movement unit 220 is different from a center of the first sensor 261, a signal output from the first sensor 261 changes. Thus, even when the movement unit 220 is maintained in a locked state and movement of the movement unit 220 is limited, the controlling unit 90 of FIG. 6 can determine that the movement unit 220 is not in a locked state.

Because the controlling unit 90 of FIG. 6 is connected to the gravity sensor unit 130 for sensing gravity through the amplifier 98, the direction in which gravity is applied may be detected. If gravity is applied in the direction illustrated in FIG. 12, it may be determined whether the movement unit 220 is in a locked state based on only a signal received from the second sensor 262 and not on a signal from the first sensor 261. Contrary to this, when gravity is applied in the X-axis direction in FIG. 12, a locked state of the movement unit 220 may be determined based on a signal from the first sensor 261 and not on a signal from the second sensor 262.

According to the above-described embodiments, it may be determined whether the locking unit 70 or 270 operates properly, using the sensor unit 60 or 260, respectively, installed as shown, so as to also perform the shake correction function without need for an additional sensor.

As described above, in a method and an apparatus for adjusting a position of an optical element according to embodiments of the invention, movement of a movement unit is limited by a simple structure to stably maintain the position of the optical element so that power consumption may be minimized. In addition, it may be determined whether a locking unit operates properly, using a sensor unit installed in a basic manner on the apparatus for adjusting a position of an optical element so as to perform a shake correction function without installing an additional sensor.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. An apparatus for adjusting a position of an optical element, the apparatus comprising:
    a support;
    a movement unit that supports an optical element and is movable relative to the support;
    a magnet unit disposed on a member selected from the group consisting of the support and the movement unit;
    a coil unit disposed on the other member of the group consisting of the support and the movement unit to correspond to the magnet unit and generates a magnetic force for moving the movement unit when an electrical signal is applied;
    a sensor unit disposed in a position corresponding to the magnet unit and detects a relative position of the movement unit with respect to the support;
    a locking unit disposed between the support and the movement unit, wherein the locking unit limits or allows movement of the movement unit; and
    a controlling unit connected to the coil unit that controls the coil unit and determines whether the movement unit is in a state where movement of the movement unit is limited by the locking unit, based on a signal output from the sensor unit.

2. The apparatus of claim 1, wherein movement of the movement unit is limited by the locking unit when the movement unit is in a position in which the movement unit is rotated with respect to the support by a predetermined angle.

3. The apparatus of claim 2, wherein the locking unit comprises:
    a magnet disposed on the support so as to be separable from an outside surface of the movement unit; and
    a yoke disposed on the movement unit to correspond to the magnet.

4. The apparatus of claim 2, wherein the locking unit comprises:
    a yoke disposed on the support so as to be separable from an outside surface of the movement unit; and
    a magnet disposed on the movement unit to correspond to the yoke.

5. The apparatus of claim 2, wherein:
    the sensor unit generates a signal that changes as the movement unit rotates and as a position of the sensor unit relative to the magnet unit changes; and
    the controlling unit determines whether the movement unit is in a state in which movement of the movement unit is limited by the locking unit, based on the signal output from the sensor unit.

6. The apparatus of claim 1, wherein:
    the magnet unit comprises a first magnet disposed such that a direction of magnetism is a first direction, and a second magnet disposed such that a direction of magnetism is a second direction that crosses the first direction;
    the sensor unit comprises a first sensor disposed to correspond to the first magnet and generates a signal according to a relative position of the first magnet in the first direction, and a second sensor disposed to correspond to the second magnet and generates a signal according to a relative position of the second magnet in the second direction; and
    the controlling unit determines whether the locking unit and the movement unit are in a coupled state, based on at least one signal from the first sensor and the second sensor.

7. The apparatus of claim 6, further comprising a gravity sensor unit that detects a change in a position of the support with respect to a gravity direction, wherein the controlling unit selects one from the group consisting of the first sensor and the second sensor based on a signal of the gravity sensor unit and determines whether the locking unit and the movement unit are in a coupled state.

8. The apparatus of claim 1, wherein the sensor unit is disposed in a position aligned with the magnet unit.

9. The apparatus of claim 1, wherein the sensor unit comprises a Hall sensor.

10. An apparatus of for adjusting a position of an optical element, the apparatus comprising:
    a support;
    a movement unit that supports an optical element and is movable relative to the support;
    a magnet unit disposed on a member selected from the group consisting of the support and the movement unit;
    a coil unit disposed on the other member of the group consisting of the support and the movement unit to correspond to the magnet unit and generates a magnetic force for moving the movement unit when an electrical signal is applied;
    a sensor unit disposed in a position corresponding to the magnet unit and detects a relative position of the movement unit with respect to the support;
    a locking unit that limits or allows movement of the movement unit, wherein the locking unit comprises:
        a coupling pin that can be inserted in a hole formed in the movement unit; and
        a driving unit for moving the coupling pin such that the coupling pin is inserted in the hole; and
    a controlling unit connected to the coil unit that controls the coil unit and determines whether the movement unit is in a state where movement of the movement unit is limited by the locking unit, based on a signal output from the sensor unit.

11. The apparatus of claim 10, wherein the locking unit operates in response to a control signal applied by the controlling unit, and a position of the locking unit is changed between a locked position in which the locking unit contacts the movement unit and a release position in which the locking unit is separated from the movement unit.

12. The apparatus of claim 10, wherein:
the sensor unit generates a signal that changes as the movement unit rotates and as a position of the sensor unit relative to the magnet unit changes; and
the controlling unit drives the locking unit to move to the locked position, drives the coil unit to rotate the movement unit, and receives the signal output from the sensor unit to determine whether the locking unit and the movement unit are in a coupled state, based on the signal output from the sensor unit.

13. The apparatus of claim 10, wherein the locking unit further comprises a plate that extends from one side of the support to another side of the support, and the coupling pin protrudes from the plate.

14. The apparatus of claim 10, wherein the driving unit of the locking unit drives off center of a coupling pin axis.

15. The apparatus of claim 10, wherein the locking unit is in contact with the support.

16. A method of adjusting a position of an optical element, the method comprising:
limiting movement of a movement unit using a locking unit disposed between the movement unit and a support, wherein the movement unit supports an optical element and is movable relative to the support;
receiving a signal output from a sensor unit disposed on a member selected from the group consisting of the support and the movement unit to correspond to a magnet unit disposed on the other member of the group consisting of the support and the movement unit; and
determining whether the movement unit is in a state in which movement of the movement unit is limited, based on the signal output from the sensor unit.

17. The method of claim 16, wherein the limiting of movement of the movement unit comprises limiting rotation of the movement unit when the movement unit is in a position in which the movement unit is rotated with respect to the support by a predetermined angle.

18. The method of claim 17, wherein:
the sensor unit generates a signal that changes as the movement unit moves and as a position of the sensor unit relative to the magnet unit changes; and
the determining of whether the movement unit is in a state in which movement of the movement unit is limited comprises determining whether the movement unit is in a state in which movement of the movement unit is limited, based on the signal output from the sensor unit.

19. The method of claim 16, wherein:
the sensor unit generates a signal that changes as the movement unit moves and as a position of the sensor unit relative to the magnet unit changes;
the limiting of movement of the movement unit comprises:
limiting movement of the movement unit by contacting the locking unit of which a position is changed between a locked position in which the locking unit contacts the movement unit, and a release position in which the locking unit is separated from the movement unit, and
generating power for rotating the movement unit; and
the determining of whether the movement unit is in a state where movement of the movement unit is limited comprises determining whether the movement unit is in a state where movement of the movement unit is limited, based on the signal output from the sensor unit.

20. The method of claim 16, wherein the sensor unit is disposed in a position aligned with the magnet unit.

21. The method of claim 16, wherein the sensor unit comprises a Hall sensor.

\* \* \* \* \*

UNITED STATES PATENT AND TRADEMARK OFFICE
CERTIFICATE OF CORRECTION

PATENT NO. : 8,699,136 B2
APPLICATION NO. : 13/272398
DATED : April 15, 2014
INVENTOR(S) : Young-jae Hwang, Jin-gi Lee and Kwang-seok Byon It is certified that error appears in the above-identified patent and that said Letters Patent is hereby corrected as shown below:

IN THE CLAIMS:

In Claim 10, Column 12, line 36, replace "An apparatus of for adjusting a position"
with -- An apparatus for adjusting a position --

Signed and Sealed this
Twenty-ninth Day of July, 2014

Michelle K. Lee
*Deputy Director of the United States Patent and Trademark Office*